United States Patent
Gupta et al.

(10) Patent No.: US 11,119,727 B1
(45) Date of Patent: Sep. 14, 2021

(54) DIGITAL TUTORIAL GENERATION SYSTEM

(71) Applicant: Adobe Inc., San Jose, CA (US)

(72) Inventors: Subham Gupta, Roorkee (IN); Sudhir Tubegere Shankaranarayana, Bangalore (IN); Jaideep Jeyakar, Bangalore (IN); Ashutosh Dwivedi, Bengaluru (IN)

(73) Assignee: Adobe Inc., San Jose, CA (US)

(*) Notice: Subject to any disclaimer, the term of this patent is extended or adjusted under 35 U.S.C. 154(b) by 0 days.

(21) Appl. No.: 16/912,190

(22) Filed: Jun. 25, 2020

(51) Int. Cl.
| | |
|---|---|
| *G06F 3/16* | (2006.01) |
| *G10L 25/48* | (2013.01) |
| *G06F 3/0488* | (2013.01) |
| *G06F 3/0482* | (2013.01) |

(52) U.S. Cl.
CPC ............ *G06F 3/167* (2013.01); *G06F 3/0482* (2013.01); *G06F 3/04883* (2013.01); *G06F 3/165* (2013.01); *G10L 25/48* (2013.01)

(58) Field of Classification Search
CPC . G06F 3/167; G06F 3/16; G06F 3/165; G06F 3/0482; G06F 3/0481; G06F 3/048; G06F 3/0488; G06F 3/04883; G10L 25/48; G10L 25/00
USPC .................................................. 715/700, 705
See application file for complete search history.

(56) References Cited

U.S. PATENT DOCUMENTS

| | | | | |
|---|---|---|---|---|
| 5,880,788 | A * | 3/1999 | Bregler | G10L 15/24 |
| | | | | 348/515 |
| 2002/0010916 | A1 * | 1/2002 | Thong | H04N 5/278 |
| | | | | 725/1 |
| 2002/0087569 | A1 * | 7/2002 | Fischer | H04N 21/435 |
| 2006/0149558 | A1 * | 7/2006 | Kahn | G10L 15/18 |
| | | | | 704/278 |
| 2007/0015118 | A1 * | 1/2007 | Nickell | G09B 5/02 |
| | | | | 434/118 |

(Continued)

OTHER PUBLICATIONS

Grabler, "Generating Photo Manipulation Tutorials by Demonstration", ACM Transactions on Graphics, vol. 28, No. 3, Article 66, Aug. 2009. (Year: 2009).*

(Continued)

*Primary Examiner* — Reza Nabi
*Assistant Examiner* — Hwei-Min Lu
(74) *Attorney, Agent, or Firm* — FIG. 1 Patents

(57) ABSTRACT

Digital tutorial generation techniques and systems are described in which a digital tutorial is generated automatically and without user intervention. History data is generated describing a sequence of user inputs provided as part of user interaction with an application and audio data is received capturing user utterances, e.g., speech, from a microphone of the computing device. A step-identification module of the tutorial generation system identifies a plurality of tutorial steps based on a sequence of user inputs described by the history data. A segmentation module of the tutorial generation system then generates a plurality of audio segments from the audio data corresponding to respective ones of the plurality of tutorial steps. The digital tutorial is then generated by a synchronization module of the tutorial generation system by synchronizing the plurality of audio segments as part of the plurality of tutorial steps, which is then output.

20 Claims, 8 Drawing Sheets

(56) References Cited

U.S. PATENT DOCUMENTS

| | | | | |
|---|---|---|---|---|
| 2011/0225494 | A1* | 9/2011 | Shmuylovich | G06F 3/04883 |
| | | | | 715/705 |
| 2013/0129316 | A1* | 5/2013 | Dontcheva | H04N 5/76 |
| | | | | 386/241 |
| 2014/0372850 | A1* | 12/2014 | Campbell | G06F 40/18 |
| | | | | 715/212 |
| 2015/0213726 | A1* | 7/2015 | Holtzman | G09B 5/06 |
| | | | | 434/365 |
| 2015/0242104 | A1* | 8/2015 | Stokman | G11B 27/031 |
| | | | | 715/723 |
| 2018/0032610 | A1* | 2/2018 | Cameron | G06F 40/284 |
| 2018/0158355 | A1* | 6/2018 | Ben-Naim | G06Q 50/20 |
| 2020/0007943 | A1* | 1/2020 | Filmeyer | G06F 16/745 |
| 2020/0335004 | A1* | 10/2020 | Aoki | G06N 20/00 |

OTHER PUBLICATIONS

Pongnumkul et al. "Pause-and-play: Automatically linking screencast video tutorials with applications", Proceedings of the 24th Annual ACM Symposium on User Interface Software and Technology (UIST 2011), Oct. 16-19, 2011. (Year: 2011).*

Chi et al., "MixT: Automatic Generation of Step-by-Step Mixed Media Tutorials", Proceedings of the 25th Annual ACM Symposium on User Interface Software and Technology (UIST '12), Oct. 7-10, 2012, pp. 93-102. (Year: 2012).*

Wang et al., "EverTutor: Automatically Creating Interactive Guided Tutorials on Smartphones by User Demonstration", Proceedings of the SIGCHI Conference on Human Factors in Computing Systems (CHI '14), pp. 4027-4036. (Year: 2014).*

Li et al., "Intelligently Creating Contextual Tutorials for GUI Applications", 2015 IEEE UIC-ATC-ScalCom-CBDCom-IoP, pp. 187-196 . (Year: 2015).*

Mysore et al., "Torta: Generating Mixed-Media GUI and Command-Line App Tutorials Using Operating-System-Wide Activity Tracing", Proceedings of the 30th Annual ACM Symposium on User Interface Software and Technology (UIST 2017), Oct. 22-25, 2017, pp. 703-714. (Year: 2017).*

* cited by examiner

DIGITAL TUTORIAL GENERATION SYSTEM

BACKGROUND

Functionality is continually added to applications that are executable by computing devices in order to expand the number of features made available by the applications. Consequently, complexity of these applications also continues to increase. For example, word-processing applications began as supporting simple text entry functionality readily understandable by a user that is familiar with a typewriter. This functionality then expanded to include functionality to change an appearance of the text, layout of the text within a page, incorporate additional types of digital content, design elements, autoformatting, cross-referencing, tables, and so forth. Other types of applications exhibit even greater amounts of complexity, such as an application configured to edit digital images or other types of digital content.

Consequently, applications typically support tens of thousands of features and actions (i.e., operations) that are executable to support this functionality, which are interrelated to each other. As a result, user interaction with applications when executed by a computing device typically involves specialized knowledge in order to progress beyond basic functionality supported by the applications, e.g., to enter text.

Conventional techniques used to provide this knowledge, however, suffer from numerous challenges. For example, help manuals integrated as part of the application are limited to scenarios envisioned by the application developer and therefore have limited scope. Further, user interaction with the integrated help manuals typically involves keyword searches to locate functionality of interest and are thus limited by a user's ability to textually express these features to locate desired functionality within the application, and thus are inaccurate. In another example, conventional tutorials rely on an output of text to provide instruction regarding features included as part of the application. However, conventional techniques used to output the text are complex and degrade the user experience by requiring a user's attention to alternate between an output of the text and interaction with corresponding features of the application. Accordingly, the inability to find and utilize the functionality of the applications executed by the computing device, due to limitations of these conventional techniques, hinders operation of the computing device and a user's experience with the computing device.

SUMMARY

Digital tutorial generation techniques and systems are described in which a digital tutorial is generated automatically and without user intervention. In one example, a tutorial generation system receives user inputs from a tutorial creator along with audio data (e.g., of a voice of the tutorial creator) providing context for the user inputs. History data is generated describing a sequence of user inputs provided as part of this user interaction and audio data is received (e.g., via a microphone) capturing user utterances, e.g., speech, from a microphone of the computing device. The audio data and history data are then received by the tutorial generation system and used to generate a digital tutorial, automatically and without user intervention.

To do so, a step-identification module of the tutorial generation system identifies a plurality of tutorial steps based on a sequence of user inputs described by the history data. A segmentation module of the tutorial generation system then generates a plurality of audio segments corresponding to respective ones of the plurality of tutorial steps. Timestamps from the history data above, for instance, are matched to timestamps in the audio data to segment the audio data. The digital tutorial is then generated by a synchronization module of the tutorial generation system by synchronizing the plurality of audio segments as part of the plurality of tutorial steps, which is then output. In this way, the digital tutorial is then "played back" to recreate the user inputs and corresponding utterances of the user.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
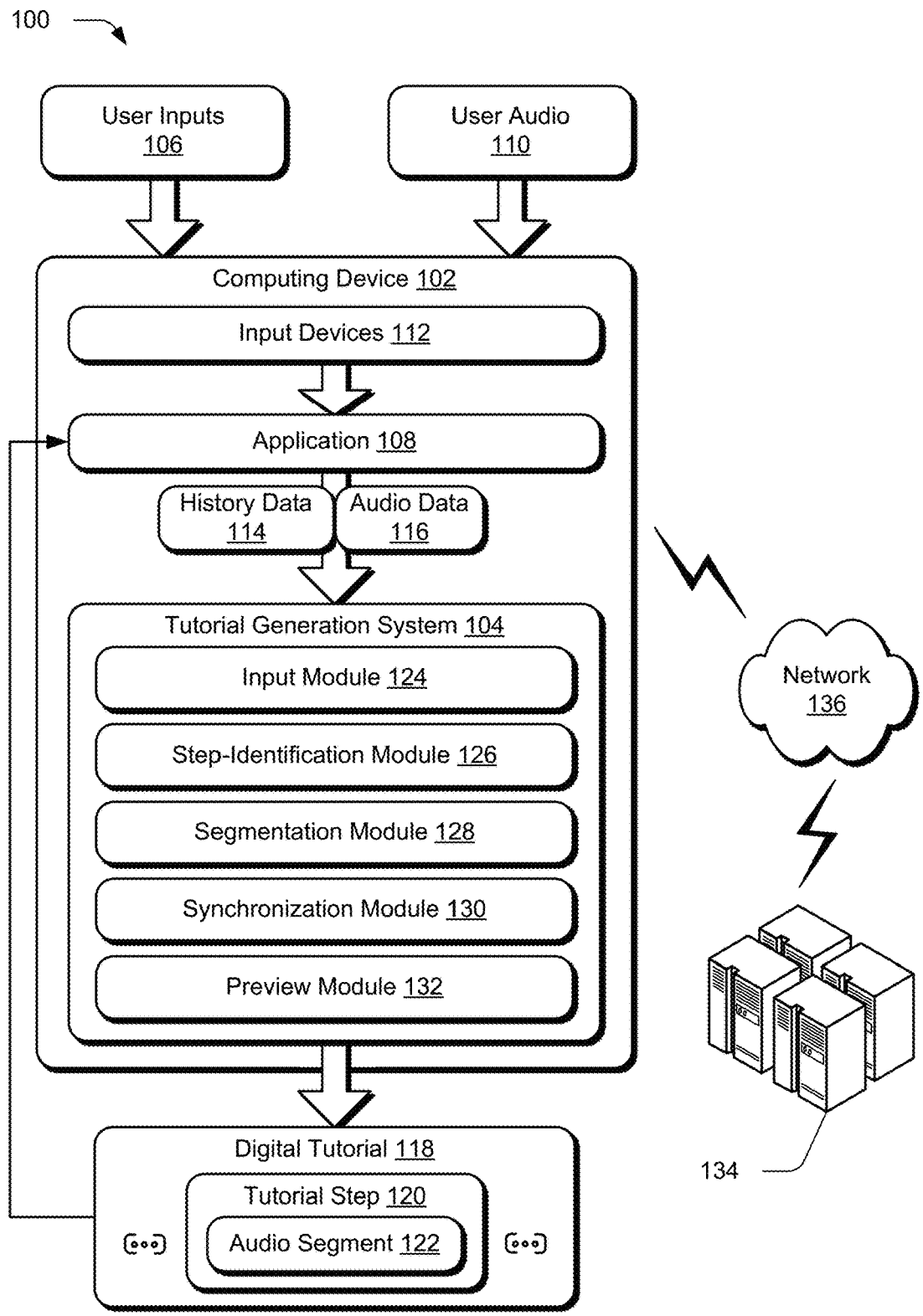
FIG. 1 is an illustration of an environment in an example implementation that is operable to employ digital tutorial generation techniques described herein.

Modern applications used for generation and editing of digital content typically include a multitude of features (e.g., controls and operations initiated in response to the controls) in order to support a wide range of functionality. However, this multitude of features has caused a corresponding increase in complexity in interacting with the application. A typical digital content editing application, for instance, typically supports a variety of menus, controls, gestures, and so forth to access this functionality. Accordingly, navigation through these menus, controls, and gestures typically requires specialized knowledge that in some instances is not intuitive to the user. Although techniques have been developed to provide access to this knowledge, these techniques are confronted with numerous challenges, including limitations of keyword searches, text output as interfering with user interaction with the application, and are difficult to generate.

One significant shortcoming of conventional interactive digital tutorials, for instance, involves how to create the tutorial. Conventional tutorial creation processes, for instance, require performances of a sequence of operations (e.g., photo editing operations) that the tutorial creator intends to be the subject of a tutorial. After performing the entire sequence of operations, a tutorial structure is generated along with text block prompts for the tutorial creator to provide textual instructions for each operation in the sequence of operations. While such a conventional tutorial generation process is convenient for tutorials involving few operations, it quickly becomes unmanageable when scaled to a tutorial that includes a large number of operations and thus results in user frustration and inefficient use of computational resources.

In particular, requiring a tutorial creator to backtrack the entire sequence of operations and compose a textual description for each operation is tedious and time consuming, particularly when the tutorial creator generates the tutorial on a small form-factor computing device, such as a mobile phone or wearable device. Furthermore, it is unnatural for the tutorial creator to retrace their thoughts to determine why one operation from the list of the entire sequence of operations was performed, after completing the sequence of operations. For example, in a scenario where conventional tutorial generation systems are used to generate a tutorial for a photo editing process comprising hundreds of operations, it is difficult for the tutorial creator to remember why a 35th operation in the sequence of operations was performed, which results in inaccurate descriptions of tutorial operations and causes the tutorial to fail for its intended purpose.

Accordingly, digital tutorial generation techniques and systems are described in which a digital tutorial is generated automatically and without user intervention. In one example, a tutorial generation system receives user inputs from a tutorial creator along with audio data (e.g., of a voice of the tutorial creator) providing context for the user inputs. The tutorial generation system, for instance, is executed by a computing device to monitor user interaction with a user interface of an application. Based on this, history data is generated describing a sequence of user inputs provided as part of this user interaction and audio data capturing user utterances, e.g., speech, from a microphone of the computing device is generated. For example, the history data describes which controls are initiated via a corresponding user input, navigation through menus, gestures performed, and so forth. The audio data and history data are then received by the tutorial generation system and used to generate a digital tutorial, automatically and without user intervention.

To do so, a step-identification module of the tutorial generation system identifies a plurality of tutorial steps based on a sequence of user inputs described by the history data. In one example, this includes identifying where in the sequence a corresponding tutorial step is located, a start time indicated as a timestamp indicating when the tutorial step started, an end time indicated by a timestamp as to when the tutorial step completed, an indication of a type of tutorial step (e.g., action of the application initiated in response to the user input), a value of an attribute before an action is performed as part of the tutorial step, and a value of the attribute after the action is performed as part of the tutorial step. The history data, for instance, as part of interaction with a digital image editing application describes a sequence of edits performed for a digital image. A plurality of tutorial steps is then identified from this data, an example of which is shown in the following table.

| Sequence | Start Time | End Time | Step Type | Step Value Start | Step Value End |
|---|---|---|---|---|---|
| 1 | 0 | 12.69 | Exposure | 0 | +0.33 |
| 2 | 12.69 | 20.31 | Shadows | 0 | +15 |
| 3 | 20.31 | 27.83 | Temp. | 0 | −10 |

From this, a segmentation module of the tutorial generation system generates a plurality of audio segments corresponding to respective ones of the plurality of tutorial steps. Timestamps from the history data above, for instance, are matched to timestamps in the audio data to segment the audio data. The digital tutorial is then generated by a synchronization module of the tutorial generation system by synchronizing the plurality of audio segments as part of the plurality of tutorial steps, which is then output. In this way, the digital tutorial is then "played back" to recreate the user inputs and corresponding utterances of the user.

In an implementation, generation of the digital tutorial begins with a blank tutorial document template which is then modified by the tutorial generation system by defining and adding one or more fields that extend the tutorial template to include playback of the audio segments, e.g., a voice of the tutorial creator. The tutorial generation system thus enables tutorial creators to generate a digital tutorial non-modally by simply applying user inputs to an application while orally describing the user inputs, eliminating a requirement of conventional techniques for tutorial creators to backtrack and textually describe various inputs after an entire sequence of inputs for the tutorial have been provided. The resulting tutorial provides an experience for a tutorial consumer as though the consumer were sitting next to the tutorial creator while the tutorial creator was providing the user inputs to the application. In this manner, the digital tutorial further preserves tutorial instructions in the form of a tutorial creator's voice, enabling the digital tutorial to convey the creator's cadence and teaching style in an unadulterated manner. Maintaining the tutorial creator's voice represents a significant improvement over other conventional approaches that convert tutorial text to synthesized speech, which strips vocal inflections and other verbal cues that otherwise aid a viewing user in comprehending a subject of the tutorial.

By eliminating a conventional requirement for tutorial creators to textually define each tutorial step, the techniques described herein advantageously reduce a number of input operations and steps required of a tutorial creator to generate the digital tutorial, thereby reducing computational and network resources otherwise required by conventional tutorial generation systems. Furthermore, by generating digital tutorials in a universal format, the techniques described herein eliminate a conventional requirement for a tutorial consumer to navigate outside the native context of an application for which the tutorial is generated, thereby helping users to achieve their goals faster and in a manner with increased engagement as opposed to conventional tutorials.

Term Examples

"Digital content" is any form of content that is interpretable by a computing device. Examples of digital content include digital images, digital documents, digital audio, digital media, digital video, and so forth.

"Applications" are a program or piece of software designed and written to fulfil a particular purpose through execution by a processing system and is storable in computer readable storage media. Digital content editing applications are designed to create and/or edit digital content, examples of which include spreadsheet applications, word processing applications, digital image editing applications, and so forth.

"Audio data" is data is that computer readable to represent and/or render audio, e.g., music, spoken utterances, and so forth.

A "digital tutorial" is a tutorial that is computer readable to provide a series of instructions, e.g., as steps, relating to a topic in order to transfer knowledge as part of a learning process. A digital tutorial, for instance, is generated in the techniques described herein to specify how user interaction is to occur with respect to an application to achieve a result.

Example Environment

FIG. 1 is an illustration of a digital medium tutorial generation environment 100 in an example implementation that is operable to employ the tutorial generation techniques described herein. The illustrated environment 100 includes a computing device 102, capable of being implemented in various configurations. The computing device 102, for instance, is configurable as a desktop computer, a laptop computer, a mobile device (e.g., assuming a handheld configuration such as a tablet or mobile phone), and so forth. Thus, the computing device 102 ranges from a full resource device with substantial memory and processor resources (e.g., personal computers, game consoles) to a low-resource device with limited memory and/or processing resources (e.g., mobile devices). Additionally, although a single computing device 102 is shown, the computing device 102 is also representative of a plurality of different devices, such as multiple servers to perform operations "over the cloud" as described in further detail below with respect to FIG. 8.

The computing device 102 is illustrated as including a tutorial generation system 104. The tutorial generation system 104 represents functionality of the computing device 102 to receive and monitor one or more user inputs 106 to an application 108 implemented by the computing device in order to generate a digital tutorial 118. As described above, the application 108 is representative of any suitable type of software application configured for execution by a processing system of the computing device 102, such as a word processing application, an image processing application, an operating system, and so forth. In addition to monitoring user input 106 to the application 108, the tutorial generation system 104 is further representative of functionality of the computing device 102 to receive user audio 110, which in some implementations includes a vocal description of the user inputs 106. This is performed using input devices 112 of the computing device 102, examples of which include cursor control devices (e.g., a mouse), touchscreens, microphones, keyboards, digital image capture devices, depth-sensing devices, and so forth. User inputs 106, for instance, are captured as a sequence of user inputs described using history data 114 based on user interaction with a cursor control device and user audio 110 is captured using a microphone as audio data 116.

Consider an example scenario where the application 108 is configured as a word processing application and the user inputs 106 are described as part of the history data 114 that represent selection of text content and modification of a visual appearance of the selected text content to have bold and italicized font attributes. In this example, the user audio 110 captured as audio data 116 represents spoken utterances of a user providing the user inputs 106, as captured by a microphone of the computing device 102. Continuing this example, while providing the user input 106 to bold and italicize selected font, audio data 116 is captured explaining "I like to add bold and italic font attributes to important text so that it stands out and immediately captures the reader's attention." Alternatively or additionally, the user audio 110 and corresponding audio data 116 is received from a source other than a source from which the user inputs 106 are received. For instance, although described herein in the example context of being a tutorial creator's voice, user audio 110 and subsequently captured audio data 116 is representative of audible information output by any source, such as computer-generated audio, human speech, combinations thereof, and the like. Thus, as described herein, the user audio 110 and corresponding audio data 116 is representative of audible information describing, or otherwise providing context for, the user inputs 106 relative to the application 108.

Using the techniques described herein, the tutorial generation system 104 is configured to generate a digital tutorial 118 including a sequence of tutorial steps 120 and associated audio segments 122 based on the history data 114 and the audio data 116. In this manner, the tutorial generation system 104 enables tutorial creators to manually interact with the application 108 while orally providing context for various interactions using audio data 116, such as a motivation for performing a certain user input 106, an intended outcome to be achieved by user input 106, and so forth. By automatically preserving the oral context included in the audio data 116, the tutorial generation system 104 eliminates a conventional requirement for a tutorial creator to first input a sequence of application operations (e.g., image editing operations) and later retrace these operations to then describe why certain operations were performed to produce a desired result (e.g., an image with increased sharpness and contrast).

To generate the digital tutorial 118, the tutorial generation system 104 employs an input module 124, a step-identification module 126, a segmentation module 128, a synchronization module 130, and a preview module 132. These modules are each implemented at least partially in hardware of the computing device 102 (e.g., through use of a processing system and computer-readable storage media), as described in further detail below with respect to FIG. 8.

The input module 124 is configured to monitor user interaction with the application 108 and as part of this collect history data 114 and audio data 116 as previously described. The history data 114 describes a sequence of user inputs 106 as part of this user interaction with the application 108 and audio data 116 captures user utterances from the user audio 110. The history data 114 and audio data 116 are then used to generate the digital tutorial 118, automatically and without user intervention.

To do so, the step-identification module 126 of the tutorial generation system 104 identifies a plurality of tutorial steps 120 based on a sequence of user inputs 106 described by the history data 114. In one example, this includes identifying where in the sequence a corresponding tutorial step 120 is located, a start time indicated as a timestamp indicating when the tutorial step 120 started, an end time indicated as a timestamp indicating when the tutorial step 120 completed, an indication of a type of step (i.e., a type of action of the application initiated within the step), a value of an attribute before an action is performed by the application 108 as part of the tutorial step 120, and a value of the attribute after the action is performed by the application 108 as part of the tutorial step 120.

From this, the segmentation module 128 of the tutorial generation system 104 generates a plurality of audio segments 122 corresponding to respective ones of the plurality of tutorial steps 120. Timestamps from the history data 114 above, for instance, are matched to timestamps in the audio data 116 to segment the audio data 116. The digital tutorial 118 is then generated by the synchronization module 130 of the tutorial generation system 104 by synchronizing the plurality of audio segments 122 as part of the plurality of tutorial steps 120, which is then output. The digital tutorial is thus configured to be "played back" to recreate the user inputs 106 and corresponding utterances of the user of the user audio 110.

In some implementations, the preview module 132 further provides an option to modify audio segments 122 associated with the tutorial step 120, such as to delete a portion of the corresponding audio segment 122, add to the corresponding audio segment 122, replace a portion of the corresponding audio segment 122, or combinations thereof. In this manner, the preview module 132 supports user interaction to examine individual tutorial steps 120 before completing generation of the digital tutorial 118 and remedy any mistakes made while providing the user audio 110 (e.g., replacing audio that describes an application control by the wrong name).

In some implementations, the digital tutorial 118 is generated by the synchronization module 130 in a universal format that is extendable to a range of different computing device and application types, an example of which is a Portable Tutorial Format (PTF) document. Although described and illustrated herein as having audio segments 122 associated with each tutorial step 120, in some implementations the digital tutorial 118 includes one or more tutorial steps 120 without an associated audio segment 122.

In order to generate the digital tutorial 118 in universal format, the synchronization module 130 begins with an empty tutorial template document. The synchronization module 130 obtains the empty tutorial template document from any number of sources, such as from local storage of the computing device 102 and/or from one or more storage locations 134 implemented remote from the computing device 102, such as via network 136. The synchronization module 130 then inserts the audio segments 122 generated by the segmentation module 128 into the tutorial template. In order to adapt the tutorial template to include the audio segment 122, the synchronization module 130 defines new fields in the tutorial template for inclusion of the audio segment 122 as described in further detail below.

The digital tutorial 118 is then output to storage of the computing device 102 for subsequent access during use of the application 108, as described in further detail below with respect to FIG. 8. Alternatively or additionally, the tutorial generation system 104 provides the digital tutorial 118 to a service provider, another computing device, or storage location 134 for subsequent retrieval and/or access by the computing device 102 or different computing devices.

Having considered an example digital medium environment, consider now a description of an example system useable to generate a digital tutorial in accordance with one or more implementations.

Figure 2:
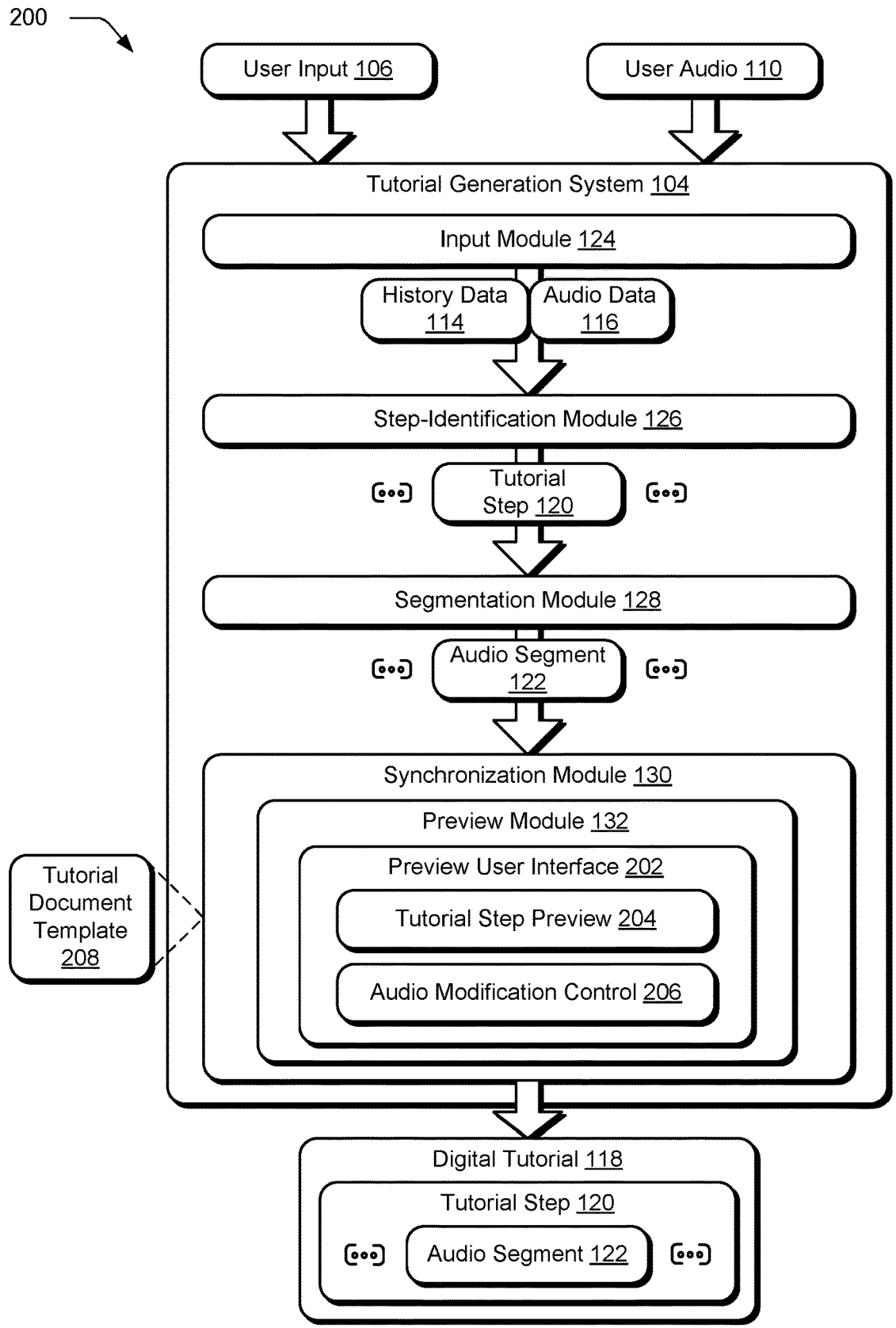
FIG. 2 illustrates an example implementation in which a tutorial generation system of FIG. 1 is shown in greater detail as generating a digital tutorial.

FIG. 2 illustrates an example system 200 useable to generate a digital tutorial 118 from a user input 106 described using history data 114 to an application 108 and user audio 110 described using audio data 116 that provides an audible context for the user input 106, in accordance with the techniques described herein. In the illustrated example, system 200 includes the modules of the tutorial generation system 104 as described with respect to FIG. 1 including an input module 124, a step-identification module 126, a segmentation module 128, a synchronization module 130, and a preview module 132

The indication to generate the digital tutorial 118 is received via input to one or more native controls of the application 108, such as one or more controls presented in an interface of the application 108 when surfaced or otherwise presented for display at the computing device 102. Alternatively or additionally, the tutorial generation system 104 outputs a user interface separate from the application 108 that enables specification of when monitoring of user input 106 and collection of user audio 110 is to commence.

In response, in this example the input module 124 logs user inputs 106 received at one or more input devices 112 communicatively coupled to the computing device 102 implementing the tutorial generation system 104 as previously described. Example input devices 112 include a touchscreen, a pointer device (e.g., mouse), and so forth, and are described in further detail below with respect to FIG. 8. In a similar manner, the segmentation module records user audio 110 received at the input devices 112 as audio data 116, e.g., using one or more microphones.

From the history data 114, the step-identification module 126 generates tutorial steps 120. Each tutorial step 120 is representative of metadata describing one or more actions performed in response to user interaction (e.g., from a tutorial creator) via the user input 106 to application 108. For instance, application 108 is described below in the example context of being an image processing software application, where the user input 106 is associated with one or more image editing operations performed on a subject digital image. Each tutorial step 120 generated by the step-identification module 126 corresponds to a single image editing operation in this example, such that individual tutorial steps 120 correspond to individual steps involved in a sequence as part of the tutorial creator's process of editing a digital image.

Although described in the context of generating a digital tutorial 118 for an image editing application, the tutorial generation system 104 is configured to generate the digital tutorial 118 for any type of application 108 without departing from the spirit and scope of the described techniques. In some implementations, a tutorial step 120 is representative of multiple actions. However, for the purpose of simplicity, each tutorial step 120 is described herein as pertaining to a single action initiated by the application 108, e.g., as corresponding to a single one of the user inputs 106.

Each tutorial step 120 includes information that describes the user input 106 relative to a native context for the application 108 (e.g., relative to a user interface designed by a developer of the application 108). A tutorial step 120, for instance, includes information specifying a start time associated with the user input 106, an end time associated with the user input 106, a type of action (e.g., activity, function, or operation) of the application 108 associated with the user input 106, and one or more sets of start and end values for the application 108, where each set of start and end values describes a change or alteration to a value of an attribute effected by initiation of the action associated with the user input 106. Each tutorial step 120 further includes information specifying a relative ordering of the corresponding user input relative to one or more other user inputs included in the sequence that is used to define the tutorial steps 120, such as an integer specifying a sequence order for the tutorial step 120 during playback of the digital tutorial 118.

While collecting the history data 114, the input module 124 is configured to simultaneously collect audio data 116 (e.g., responsive to determining that input to the computing device 102 implementing the tutorial generation system 104 is to be recorded for inclusion in the digital tutorial 118). The tutorial generation system 104, for instance, activates a microphone included as one of the input devices 112 of the computing device 102 implementing the tutorial generation system 104 to record a tutorial creator's voice explaining the user input 106 as it is provided to the application 108.

The segmentation module 128 then generates audio segments 122 from the audio data 116 based on the tutorial steps 120. For instance, consider a scenario where the tutorial generation system 104 detects that a user of an image processing application indicates that upcoming inputs to the image processing application are to be used as the basis for generating a digital tutorial 118. In response to such a detection, the input module 124 begins recording user audio 110 (e.g., a voice of the user providing input 106 to the image processing application) as audio data 116.

As an example, the user audio 110 and subsequent audio data 116 includes a tutorial creator's voice articulating "I always try to get the light right in camera but almost always I was able to make images a bit better by adjusting the light controls. For this image, we brighten the photo by opening the exposure up about one third of a stop. Next, let's lighten the dark tones to show a ton of great information. For this, we will use the shadows slider. Slight color moves can make a big difference in an image. In this example I wanted to visually push the yellow and greens back to make her stand out more. Here, I will decrease the temp slider to make the photo cooler, more bluish."

While this example user audio 110 is being recorded as audio data 116 by the input module 124, three example user inputs 106 are received at the image processing application: one input increasing an exposure value for an image, another input increasing a shadow value for the image, and another input decreasing a temperature value for the image. Each user input, for instance, is received at a respective control offered by the image processing application, and collectively be referred to as an edit history for the digital image, altering the digital image from an original state to a modified state.

Continuing this example, the step-identification module 126 identifies the tutorial steps 120 from the history data 114. The tutorial steps 120 are then used by a segmentation module 128 to generate audio segments 122 from the audio data 116 that corresponds to these steps. In this manner, different rows of Table 1 are representative of different tutorial steps 120 generated for (1) the input increasing an exposure value for an image; (2) the input increasing a shadow value for the image; and (3) the input decreasing a temperature value for the image.

TABLE 1

| Sequence | Start Time | End Time | Input Type | Start Value | End Value |
|---|---|---|---|---|---|
| 1 | 0 | 12.69 | crs:Exposure | 0 | +0.33 |
| 2 | 12.69 | 20.31 | crs:Shadows | 0 | +15 |
| 3 | 20.31 | 27.83 | crs:Temperature | 0 | −10 |

Using the start and end times associated with each tutorial step 120, the segmentation module 128 parses the audio data 116 to generate audio segments 122 that correlate with the appropriate tutorial step 120, which is based on a comparison of timestamps, natural language processing to associate text from the audio data 116 with text of controls specified by the history data 114, and so forth. For instance, the segmentation module 128 is configured to parse the example user audio 110 described in the audio data 116 as indicated below in Table 2, to correlate with the example inputs summarized above in Table 1.

TABLE 2

| Sequence | Textual Description of Audio Segment |
|---|---|
| 1 | "I always try to get the light right in camera but almost always I was able to make images a bit better by adjusting the light controls. For this image, we brighten the photo by opening the exposure up about one third of a stop." |
| 2 | "Next, let's lighten the dark tones to show a ton of great information. For this, we will use the shadows slider." |
| 3 | "Slight color moves can make a big difference in an image. In this example I wanted to visually push the yellow and greens back to make her stand out more. Here, I will decrease the temp slider to make the photo cooler, more bluish." |

Parsing of the audio data 116 is performed using the start time and end time information associated with each tutorial step 120, assuming that audio data 116 provided during a particular user input 106 is likely to describe why the tutorial creator made the particular edit or change resulting from the input.

Figure 3:
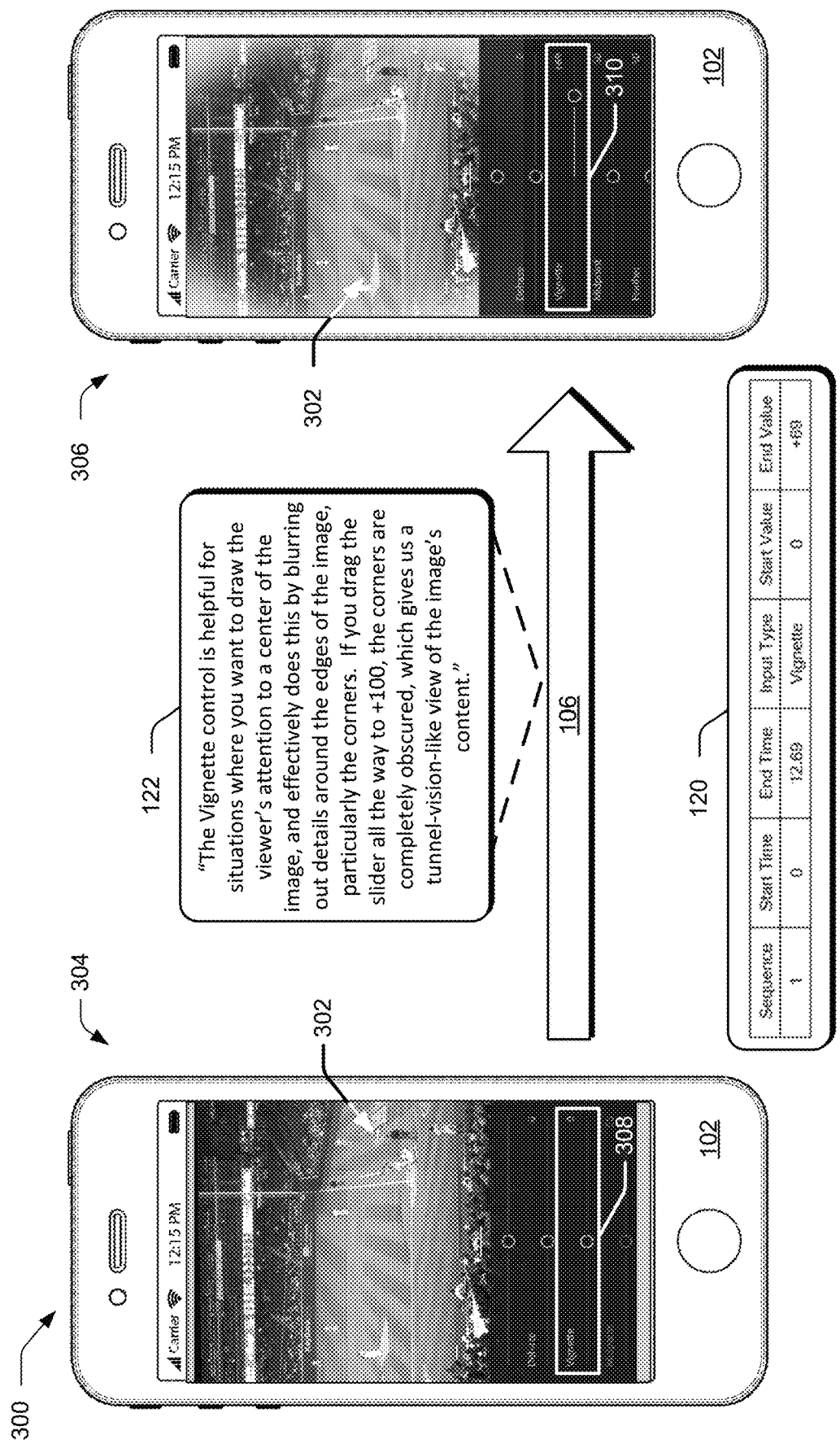
FIG. 3 illustrates example application user interfaces configured to receive user inputs for use in generating a digital tutorial in accordance with one or more implementations.

For instance, FIG. 3 illustrates an example implementation 300 of the tutorial generation system 104 generating tutorial step 120 and an audio segment 122 based on the user input 106 provided to an image processing application and user audio 110 describing the user input 106. In the example implementation 300, computing device 102 is illustrated as outputting a user interface for an image processing application, where user input 106 is received to modify an appearance of a subject image 302 from state 304 to state 306. Specifically, user input 106 modifies the subject digital image from state 304 to state 306 by adjusting a "vignette" slider control of the image processing application from a start value 308 to an end value 310.

As the user input 106 is received and recorded as history data 114, the tutorial generation system 104 further receives user audio 110 that is stored as audio data 116, which is illustrated as the voice of a user explaining the user's basis for doing so. For instance, while the user providing user input 106 slides the vignette control from start value 308 to end value 310, the user also explains that "the vignette control is helpful for situations where you want to draw the viewer's attention to a center of the image, and effectively does this by blurring out details around the edges of the image, particularly the corners. If you drag the slider all the way to +100, the corners are completely obscured, which gives us a tunnel-vision-like view of the image's content."

The step-identification module 126 is configured to monitor the user input 106 from the corresponding history data 114 to derive information describing an effect of the user input 106 and compile this information into the tutorial step 120, which indicates that the user input 106 involving movement of the vignette control is the first in a sequence of user inputs, spans 12.69 seconds in duration, pertains to a vignette control of the image processing application, and moves the vignette control from a start value of zero to an ending value of +69. Although only described and illustrated with respect to start and end values, the tutorial step 120 further includes information specifying a progression of values by which the vignette control was adjusted via input 106. For instance, the tutorial step 120 illustrated in FIG. 3 further specifies one or more intermediate values to which the vignette control was adjusted during the 12.69 seconds encompassed by tutorial step 120.

The tutorial step 120 is then communicated from the step-identification module 126 to the segmentation module 128 for forming corresponding audio segments 122 based on the tutorial steps 120. As described above, this is performed based by a comparison of timestamps, natural language processing, and so forth.

Returning to FIG. 2, each tutorial step 120 and corresponding audio segment 122 are communicated by the segmentation module 128 to the synchronization module 130 for use in associating the audio segment 122 as part of the tutorial step 120. The synchronization module 130 includes functionality of the tutorial generation system 104 to verify that the tutorial step(s) 120 and audio segment(s) 122 correspond with one another.

In some implementations where information describing the tutorial steps 120 and audio segments 122 are communicated to the synchronization module 130 in the form of Tables 1 and 2 described above, the synchronization module 130 generates three tutorial steps 120, one for each sequence entry specified in the respective tables. In some implementations, however, by virtue of being generated based on associated start and end times specified by an tutorial step 120, an audio segment 122 includes an incomplete word, sentence, thought, and the like.

To accommodate for such scenarios, the synchronization module 130 is configured to analyze each audio segment 122 using natural language processing and adjust its content as necessary to prevent beginning or ending with an incomplete word, sentence, thought, and the like. For instance, in an example scenario where one audio segment 122 ends during utterance of a word, but before the word has been completely spoken, the synchronization module 130 removes a portion of audio from a subsequent audio segment containing the remainder of the word and adds the removed portion to the audio segment 122, such that the audio segment 122 ends with the word being completely spoken. When synchronized, the audio segment 122 is included as part of the tutorial step 120 and communicated to preview module 132 for review and optional modification before incorporation into the digital tutorial 118.

The preview module 132 is configured to output a preview user interface 202 that includes a tutorial step preview 204 for a corresponding tutorial step 120 and an audio modification control 206 that is useable to modify audio associated with the tutorial step 120. In some implementations, the preview module 132 is configured to output the preview user interface 202 as part of the application 108 at which the input 106 was received, such that the tutorial step preview 204 is presented in the native context of the application 108 non-modally and does not require a tutorial creator to navigate beyond the application 108 to generate the digital tutorial 118.

Figure 4:
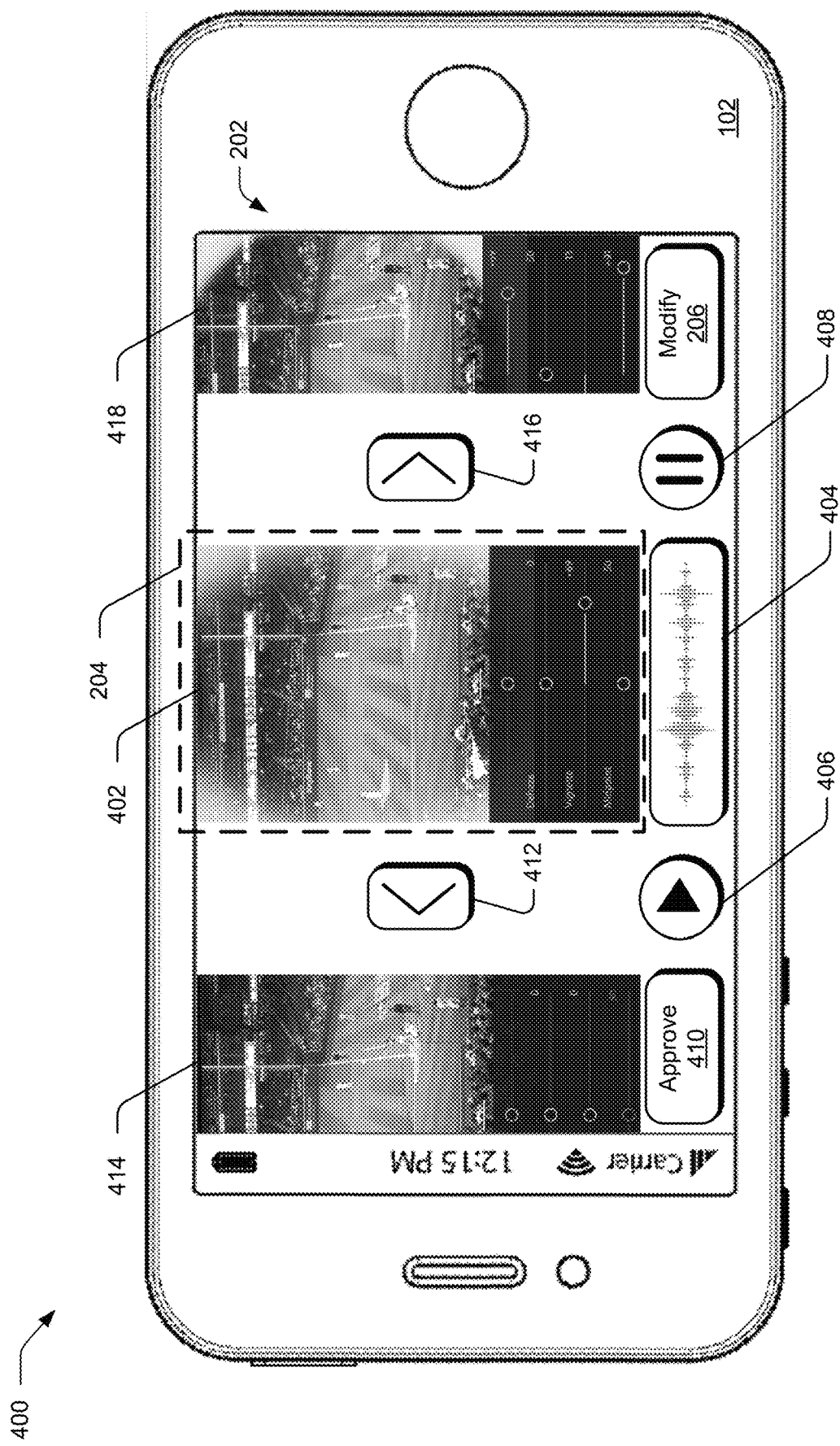
FIG. 4 illustrates an example user interface for the tutorial generation system of FIG. 1 that enables generation of a digital tutorial in accordance with one or more implementations.

FIG. 4 illustrates an example implementation 400 of a preview user interface 202 output by the preview module 132. In the example implementation 400, computing device 102 is illustrated as displaying a preview user interface 202 for a tutorial step 402 (e.g., the tutorial step generated from the user input 106 of the illustrated example of FIG. 3). Tutorial step 402 is illustrated as being presented in a tutorial step preview 204 in the native context of the application 108 at which the user input 106 was received. In this manner, the tutorial step preview 204 provides a tutorial creator with the ability to perceive how a tutorial step 120 will appear in a user interface of the application 108. The preview user interface 202 is further illustrated as including various controls for playback of the tutorial step 402, such as a visual representation 404 of audio segments associated with the tutorial step, controls 406 and 408 for playing, pausing, and otherwise navigating playback of the tutorial step 402, as it would be observed by a viewer of the digital tutorial 118.

The preview user interface 202 includes a selectable control 410 to approve the tutorial step 402 for inclusion in the digital tutorial 118 as well as an audio modification control 206 to modify audio content associated with the subject tutorial step (e.g., tutorial step 402). For instance, if during playback of the tutorial step 402 the tutorial creator realizes that they made a mistake in the user audio 110 captured by an audio segment 122 while providing input 106, the audio modification control 206 enables the tutorial creator to re-record all or a portion of audio segment 122 associated with the tutorial step 402. In some implementations, input to the visual representation 404 of the audio associated with the tutorial step 402 is used to designate a specific portion of audio segment 122 to be deleted and/or re-recorded. Alternatively or additionally, the audio modification control 206 is used to add audio to a certain point during playback of the tutorial step 402 (e.g., at a playback point specified via the visual representation 404).

The preview user interface 202 is further configured with navigation controls to navigate among various tutorial steps, such as navigation control 412 to navigate from tutorial step 402 to a preceding tutorial step 414 and navigation control 416 to navigate from tutorial step 402 to a subsequent tutorial step 418. In this manner, the preview user interface 202 enables a tutorial creator to understand exactly how a resulting digital tutorial 118 will appear to a user of the application 108.

Modification(s) received via input to the audio modification control 206 are then communicated to the synchronization module 130 for use in modifying one or more tutorial steps 120, as necessary. For instance, in response to receiving additional audio for tutorial step 402 via the audio modification control 206, the synchronization module 130 adjusts an end timestamp for the tutorial step 402 and adjust a start timestamp for the tutorial step 418 to accommodate the additional audio without disrupting subsequent steps of the tutorial.

Returning to FIG. 2, upon receiving approval from the tutorial creator for each tutorial step 120 to be included in the digital tutorial 118, the tutorial steps 120 and associated audio segments 122 form the digital tutorial 118. In some implementations, the synchronization module 130 is configured to generate the digital tutorial 118 from a tutorial document template 208. The synchronization module 130 is configured to obtain the tutorial document template 208 from any suitable source, such as from local storage of the computing device implementing the tutorial generation system 104 or from a storage location remote from the computing device implementing the tutorial generation system 104. In some implementations, a format of the tutorial document template is dependent on an application 108 for which the digital tutorial 118 is generated.

Given the tutorial document template 208, the synchronization module 130 dynamically generates the digital tutorial 118 in a universal format (e.g., as a PTF document), such that the resulting digital tutorial 118 is extendable to a range of different application types and formats (e.g., mobile, desktop, web, and the like). Being generated from the tutorial document template 208, the digital tutorial 118 includes an ordered list of the tutorial steps 120, where each list entry specifies input information, examples of which are provided above with respect to Table 1.

In one example, the synchronization module 130 is configured to define one or more fields in the tutorial document template 208 for each list entry that contain a link to, or otherwise references, a storage location for the audio segment 122 corresponding to the tutorial step 120 for the list entry. To do so, the tutorial generation system 104 is configured to output each audio segment 122 to a storage location (e.g., a cloud repository) and generate a link for accessing the audio segment 122. Alternatively or additionally, the tutorial generation system 104 stores a single file containing the entirety of the audio data 116 including the audio segments 122. In such a scenario, the synchronization module 130 is configured to include pointers (e.g., time-markers) in the defined fields to reference playback portions of the single audio file, such that upon playback of a tutorial step 120, a corresponding field of the digital tutorial 118 instructs playback of a portion of the audio file bound by the time-markers.

In this manner, the audio segment 122 for respective tutorial steps 120 includes a voice of the tutorial creator, enabling a viewer of the digital tutorial 118 to participate in a step-by-step guided explanation of various functionality, operations, or other aspects of the application 108. Using the newly defined audio fields in the document comprising the digital tutorial 118, a computing device outputting playback of the digital tutorial 118 is able to pre-fetch audio segments 122 to play on-demand during output of the digital tutorial 118. A viewing user is thus able to listen to a tutorial creator's instructions while viewing actual operations performed by the tutorial creator, and follow the steps to perform their own operations to achieve the same, or similar, results as the tutorial creator. For instance, output of a tutorial step 120 includes playback of the tutorial step 120 and audio segment 122, then reverts a state of the application to what existed prior to playback of the tutorial step 120. After reverting the application to a pre-tutorial step 120 state, a viewing user is prompted to replicate the effect of the tutorial step 120. User progress is monitored to ensure that the user has a correct grasp on subject functionality of the application 108 before proceeding to a subsequent step of the digital tutorial 118.

Having discussed example details of the techniques for generating a digital tutorial with audio guidance, consider now some example procedures to illustrate additional aspects of the techniques.

Example Procedures

The following discussion describes techniques that are implemented utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-4.

Figure 5:
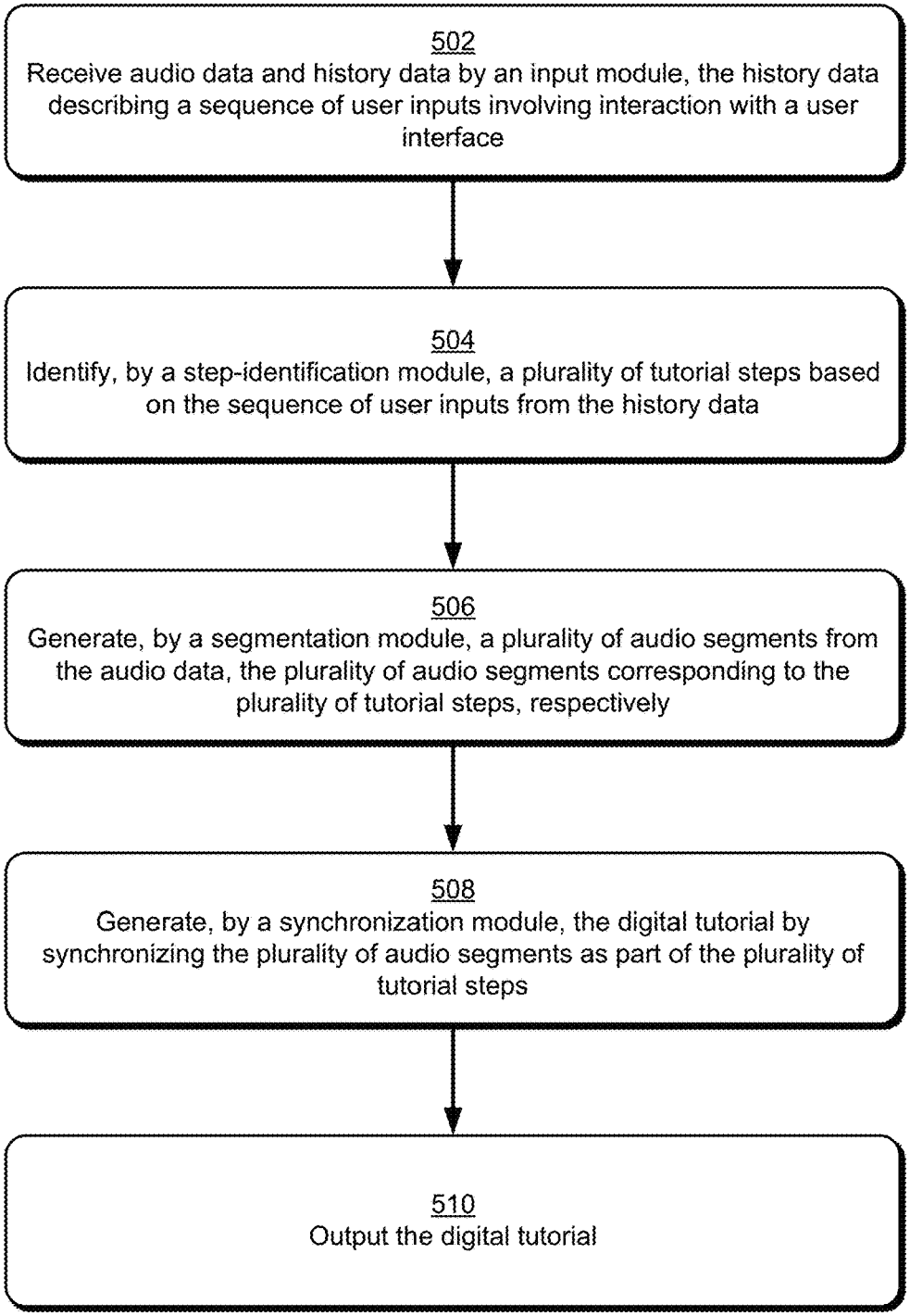
FIG. 5 is a flow diagram depicting a procedure in an example implementation for generating a digital tutorial using the techniques described herein.

FIG. 5 depicts a procedure 500 in an example implementation of generating a digital tutorial based on user inputs to an application and user audio describing user inputs to the application. Audio data 116 and history data 114 are received by an input module 124, the history data describing a sequence of user inputs involving interaction with a user interface (block 502). The computing device 102 implementing the tutorial generation system 104, for instance, receives user inputs 106 to an application 108 via one or more input devices 112 communicatively coupled to the computing device 102. The computing device 102 further receives user audio 110 which is used as a basis to generate audio data 116, providing context for the user input 106. User audio 110, for instance, is received at a microphone of the computing device 102 and used to generate the audio data 116.

A step-identification module 126 is then employed to identify a plurality of tutorial steps 120 based on the sequence of user inputs 106 from the history data 114 (block 504). The step-identification module 126 of the tutorial generation system 104, for instance, receives an indication that user inputs 106 to the application 108 are to be monitored and recorded for output as part of a digital tutorial 118. In response to receiving the indication, the step-identification module 126 generates a tutorial step 120 for one or more discrete portions of the history data 114. For instance, in the context of the illustrated example of FIG. 3, the step-identification module 126 determines that the history data 114 describes modifying a vignette slider control of an image processing application and generates a tutorial step 120 describing characteristics of the user input 106 to the vignette slider control.

The segmentation module 128 is configured to generate each tutorial step 120 as including metadata describing at least a sequence ordering for the tutorial step 120 relative to other tutorial steps generated from the sequence of user inputs 106 described by the history data 114, a start time and an end time associated with the tutorial step 120, an input type associated with the tutorial step 120, and a start value and an end value for an attribute of the application 108, collectively describing a change effected by the tutorial step 120.

Based on the individual tutorial steps 120, a plurality of audio segments 122 are generated by a segmentation module 128 from the audio data 116, the plurality of audio segments 122 corresponding to the plurality of tutorial steps 120, respectively (block 506). Using the start time and end time embedded in metadata for each of the tutorial steps 120, the segmentation module 128 parses the audio data 116 into discrete audio segments 122, such that tutorial steps 120 are associated with a portion of the audio data 116 describing the associated user input 106 from the history data 114 included in the tutorial step 120.

In some implementations, the segmentation module 128 maintains the audio data 116 as a single file and generates each audio segment 122 as including time-markers designating playback start and stop times for the audio segment 122 relative to the single file of the audio data 116, such that the audio segment 122 is useable to initiate playback of a certain portion of the audio data 116.

The digital tutorial 118 is then generated by a synchronization module 130 by synchronizing the plurality of audio segments 122 as part of the plurality of tutorial steps 120 (block 508). The synchronization module 130, for instance, receives the tutorial steps 120 generated by the step-identification module 126 and the audio segments 122 generated by the segmentation module 128. In some implementations, the synchronization module 130 is configured to alter at least a portion of the audio segment 122 included in a tutorial step 120. For instance, the synchronization module 130 employs one or more known natural language processing techniques to analyze dialogue of the audio segment 122 and determine whether playback of the audio segment 122 cuts off one or more spoken words. In response to determining that the audio segment 122 cuts off a word, sentence, or the like, the synchronization module 130 is configured to modify the audio segment 122 and at least one other sequential audio segment (e.g., the preceding and/or following audio segment that includes a portion of the cut-off word, sentence, etc.), such that playback of the modified audio segment 122 does not cut off any of the included dialogue. The digital tutorial 118 is then output that includes the plurality of tutorial steps 120 configured for sequential playback within the application 108 along with the audio segments 122 (block 510).

In an implementation, the synchronization module 130 is configured to analyze tutorial step 120 metadata included in each of the tutorial steps 120 to verify a proper ordering of the tutorial steps 120, such that playback of the digital tutorial 118 presents the tutorial steps 120 in an order intended by the tutorial creator. The synchronization module 130 is configured to generate the digital tutorial 118 in a universal format (e.g., as a PTF document) that is extendable to a range of different application types and formats, such that playback of the digital tutorial 118 is presented in the native context of the application 108 at which the input 106 was received. An example manner in which playback of the digital tutorial 118 is presented in the native context of application 108 is described in further detail below with respect to FIG. 7.

Figure 6:
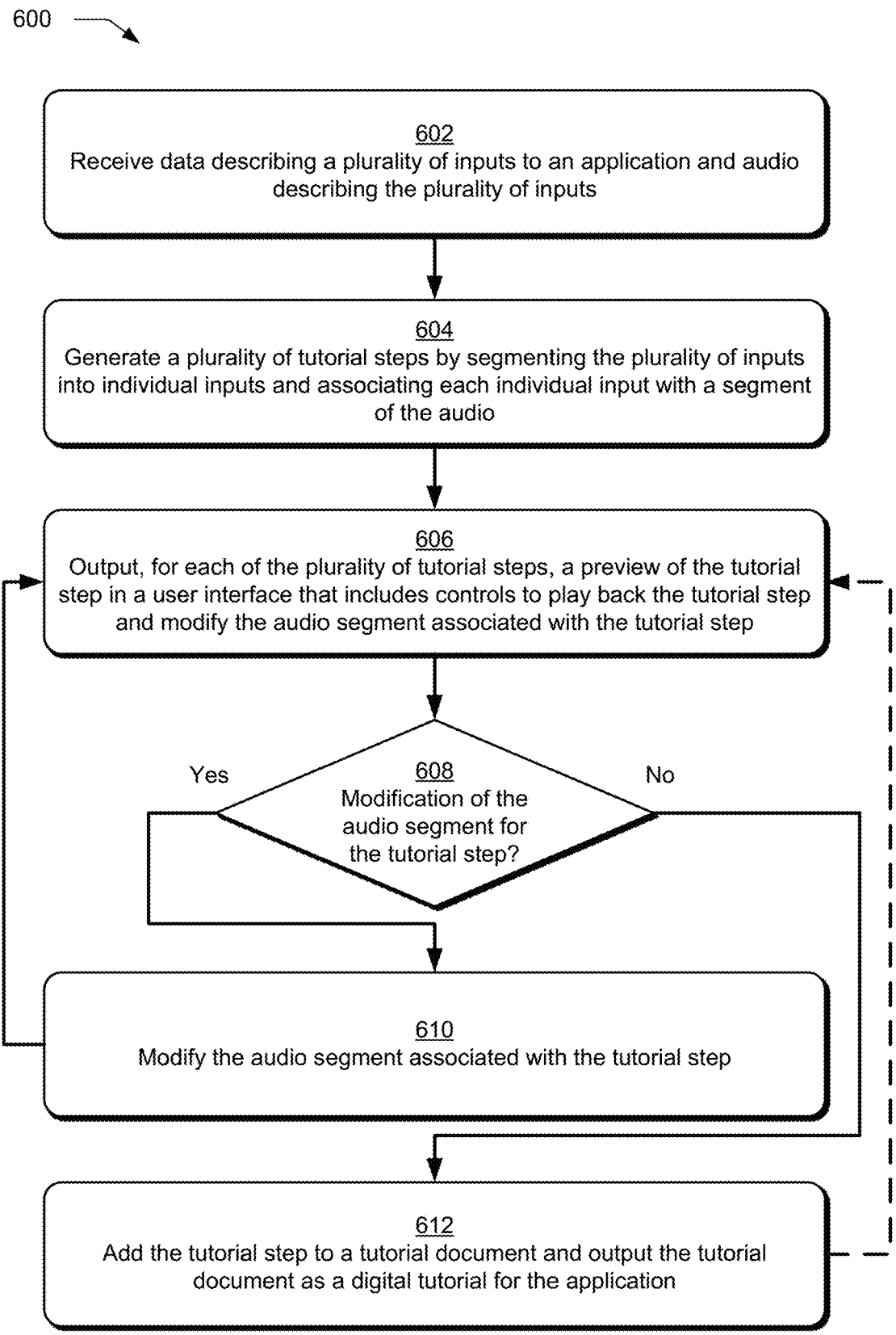
FIG. 6 is a flow diagram depicting a procedure in an example implementation for generating a digital tutorial having at least one modified tutorial step using the techniques described herein.

FIG. 6 depicts a procedure 600 in an example implementation of generating a digital tutorial based on input to an application and user audio describing the input to the application. Data describing a plurality of inputs to an application and audio describing the plurality of inputs is received (block 602), e.g., the history data 114 and the audio data 116. The computing device 102 implementing the tutorial generation system 104, for instance, receives input 106 to an application 108 via one or more input devices 112 communicatively coupled to the computing device 102. The computing device 102 further receives user audio 110, providing context for the input 106. User audio 110 is received at a microphone of the computing device 102 and used to generate the audio data 116.

A plurality of tutorial steps 120 are then generated by segmenting the plurality of inputs into individual inputs and associating each individual input with an audio segment 122 of the audio data 116 (block 604) as previously described, e.g., by the step-identification module 126, the segmentation module 128, and the synchronization module 130. Each tutorial step 120 includes metadata in an example, the metadata describing at least a sequence ordering for the tutorial step 120 relative to other tutorial steps, a start time and an end time associated with the tutorial step 120, an input type associated with the tutorial step 120, and a start value and an end value for an attribute of the application 108, collectively describing a change effected by the tutorial step 120 as previously described. Using the start time and end time embedded in metadata for each of the tutorial steps 120, the segmentation module 128 parses the audio data 116 into discrete audio segments 122, such that each tutorial step 120 is associated with a portion of the audio data 116 describing the associated user input 106 included in the tutorial step 120.

In some implementations, the segmentation module 128 maintains the user audio 110 as a single file and generates each audio segment 122 as including time-markers designating playback start and stop times for the audio segment relative to the single file of the user audio 110, such that the audio segment 122 is useable to initiate playback of a certain portion of the user audio 110. Given the tutorial steps 120 and audio segments 122, the synchronization module 130 generates a tutorial step 120 including its corresponding audio segment 122.

A preview is then output for each of the plurality of tutorial steps 120 in a user interface that includes controls to play back the tutorial step 120 and optionally modify the audio segment 122 associated with the tutorial step 120 (block 606). The preview module 132, for instance, outputs a preview user interface 202 at the computing device implementing the tutorial generation system 104 (e.g., computing device 102), such as the preview user interface 202 illustrated in FIG. 4. The preview user interface 202 is configured to display a tutorial step preview 204, which provides a display of how the corresponding tutorial step 120 of the digital tutorial 118 will appear in the native context of the application 108 when observed by a viewing user. The preview user interface 202 is further configured to include an audio modification control 206 that enables a tutorial creator to modify the audio segment 122 for the corresponding tutorial step 120. The audio modification control 206 enables the tutorial creator to delete and/or add audio to be included in the audio segment 122 for the tutorial step 120.

A determination is made as to whether a modification is made to the audio segment 122 for the tutorial step 120 (block 608). In response to determining that a modification is to be applied to the audio segment 122 for the tutorial step 120, the audio segment 122 is modified (block 610). The preview module 132, for instance, receives an input to the audio modification control 206 of the preview user interface 202 for a particular tutorial step 120, where input to the audio modification control 206 specifies at least one of deletion of audio from the tutorial step 120 or addition of audio to the tutorial step 120.

In response to such a determination, a modification describing the one or more changes to the audio segment 122 of the tutorial step 120 is generated and communicated to the synchronization module 130 for use in generating an updated tutorial step 120 that includes the audio modification(s). Operations then return to block 606, where the updated tutorial step 120 is output for preview in the preview user interface 202. Operations described in blocks 606, 608, and 610 continues until a determination is made that no modification to the audio segment 122 of the tutorial step 120 is to be made.

In response to determining that the audio segment 122 for the tutorial step 120 is not to be modified, the tutorial step 120 is added to a tutorial document template, which is output as digital tutorial 118 for the application 108 (block 612). The preview module 132, for instance, receives input at the approve control 410 of the preview user interface 202, indicating that the tutorial step 120 and audio segment 122 included in the tutorial step 120 are to be output as part of the digital tutorial 118. The synchronization module 130, for instance, combines the individual tutorial steps 120 output by the synchronization module 130 into a plurality of ordered tutorial steps 120 and outputs the ordered tutorial steps 120, as the digital tutorial 118. Each of the ordered tutorial steps 120 is associated with audio segment 122, which is representative of information describing the audio segment 122 included in the corresponding tutorial step 120.

The synchronization module 130 is configured to analyze tutorial step 120 metadata included in each of the tutorial steps 120 to verify a proper ordering of the tutorial steps 120, such that playback of the digital tutorial 118 presents the tutorial steps 120 in an order intended by the tutorial creator. The synchronization module 130 is configured to generate the digital tutorial 118 in a universal format (e.g., as a PTF document) that is extendable to a range of different application types and formats, such that playback of the digital tutorial 118 is presented in the native context of the application 108 at which the input 106 was received. Operation then returns to block 606 to preview, optionally modify, and approve a subsequent tutorial step for inclusion in the digital tutorial 118 until all tutorial steps 120 have been incorporated into the digital tutorial 118. The digital tutorial 118 is then output for playback of the tutorial steps 120 and their associated audio segment(s) 122 in the native context of the application 108 at which the input 106 was received.

Figure 7:
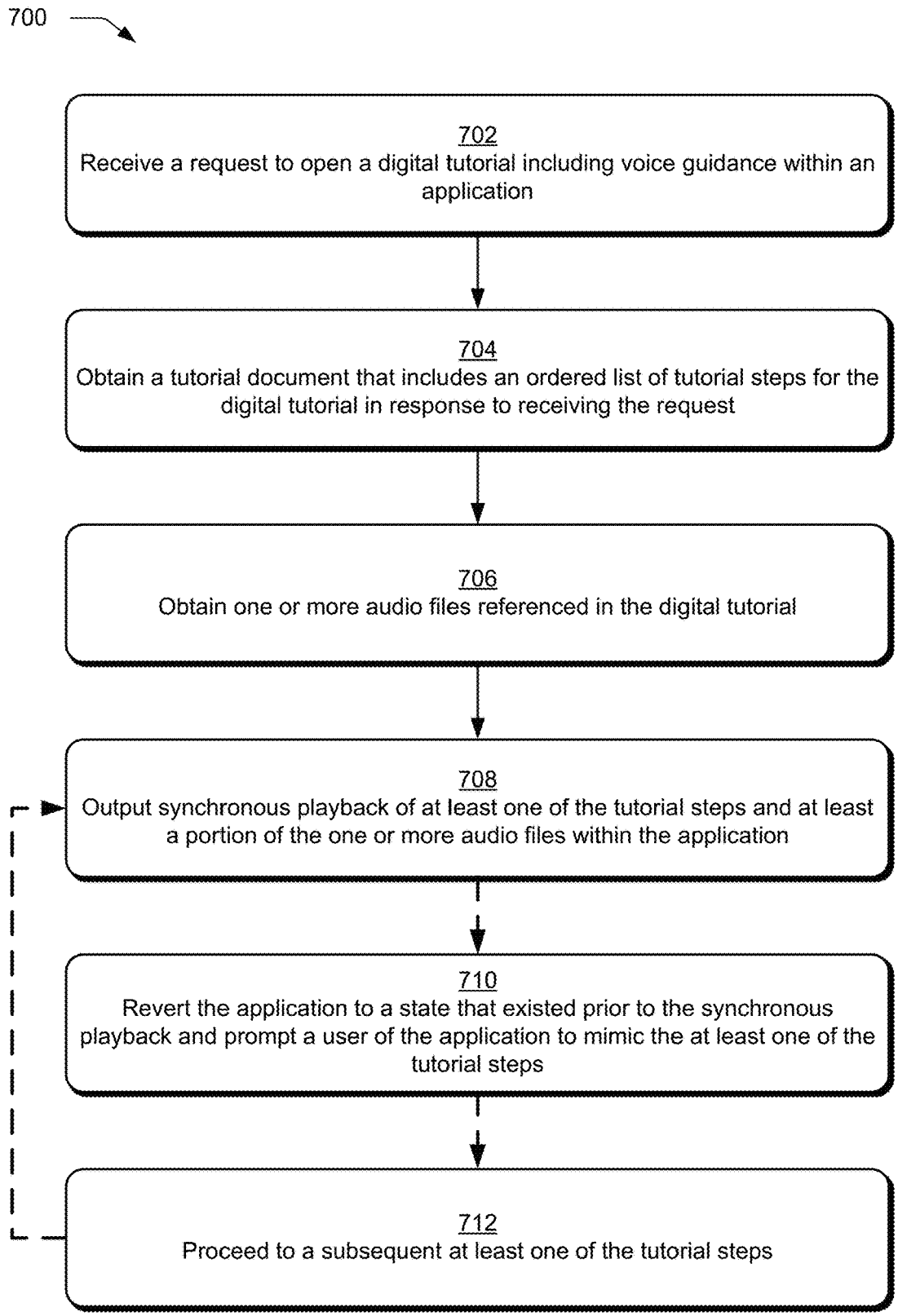
FIG. 7 is a flow diagram depicting a procedure in an example implementation for outputting a digital tutorial within an application using the techniques described herein.

FIG. 7 depicts a procedure 700 in an example implementation of outputting a digital tutorial generated in accordance with the techniques described herein. A request to open a tutorial including voice guidance within an application is received (block 702). The computing device 102 receives input to the application 108 indicating that a tutorial for the application 108 is to be opened. In some implementations, the application 108 is configured as including a native instruction service (e.g., accessible via a help icon in one or more user interfaces of the application) that is designed to assist users in understanding various functionality offered by the application 108. In some implementations, the application 108 includes interactive instructional content in the form of one or more digital tutorials 118 that is presented within a native context of the application. For instance, a digital tutorial 118 is designed to instruct a user to use a particular tool of the application 108 to achieve a desired objective (e.g., instructing the user to use the vignette control of an image processing application, as illustrated with respect to FIG. 3).

In response to receiving the request, a tutorial document that includes an ordered list of tutorial steps for the digital tutorial is obtained (block 704). The computing device 102, for instance, obtains a digital tutorial 118 configured as a PTF document from one or more storage locations, such as from local storage of the computing device 102 or from a storage location that is remote from the computing device 102 (e.g., one or more other computing devices, cloud repositories, etc.), such as from storage location 134 via network 136. In addition to obtaining the digital tutorial 118, one or more audio files for the audio data 116 referenced in the digital tutorial 118 are obtained (block 706). The computing device 102, for instance, analyzes the digital tutorial 118 to identify one or more links or references to storage locations that include audio segment 122 for various tutorial steps 120 of the digital tutorial 118. The audio segment 122 is obtained from one or more storage locations, such as from local storage of the computing device 102 or from a storage location that is remote from the computing device 102 (e.g., one or more other computing devices, cloud repositories, etc.), such as from storage location 134 via network 136.

Synchronous playback of at least one of the tutorial steps 120 and at least a portion of the one or more audio files are then output within the application 108 (block 708). The computing device 102, for instance, causes the application 108 to open the digital tutorial 118 in its native context, such as within a native instruction service for the application (e.g., accessible via a help icon in one or more user interfaces of the application) that is designed to assist users in understanding various functionality offered by the application 108. In this manner, a viewer of the digital tutorial 118 observes input 106 to the application 108 used to generate the digital tutorial 118, while listening to the corresponding user audio 110, as though the viewer was sitting next to the tutorial creator when the input 106 and user audio 110 were originally received for use in generating the digital tutorial 118.

In some implementations, tutorial step 120 metadata included in the tutorial steps 120 is leveraged to provide a hands-on learning experience for a viewer of the digital tutorial 118. For instance, after playback of the at least one of the tutorial steps 120 and a portion of the one or more audio files, the application is reverted to a state that existed prior to the synchronous playback and a user of the application is prompted to mimic the at least one of the tutorial steps 120 (block 710). For instance, as shown in FIG. 3 the synchronous playback of the at least one tutorial step includes a progression of the application 108 from a state 304 to a state 306. Upon completion of the synchronous playback, the computing device 102 reverts the application to state 304 and prompts a viewer of the tutorial to mimic the input that modified state 304 to state 306 (e.g., adjustment of a vignette slider control for the application 108 from a value of zero to a value of +69). In response to detecting that the tutorial viewer successfully mimicked the input of the tutorial step, the process 700 proceeds to a subsequent at least one of the tutorial steps (block 712). This process continues until each of the tutorial steps have been output and until all tutorial steps have been successfully reproduced by a viewing user of the digital tutorial 118. As indicated by the dashed arrows connecting blocks 708, 710, and 712, performance of operations described in blocks 710 and 712 is optional, as the digital tutorial 118 is output in the native context of the application 108 without prompting a user to mimic or otherwise reproduce various tutorial steps 120.

Having described example procedures in accordance with one or more implementations, consider now an example system and device that are utilized to implement the various techniques described herein.

Example System and Device

Figure 8:
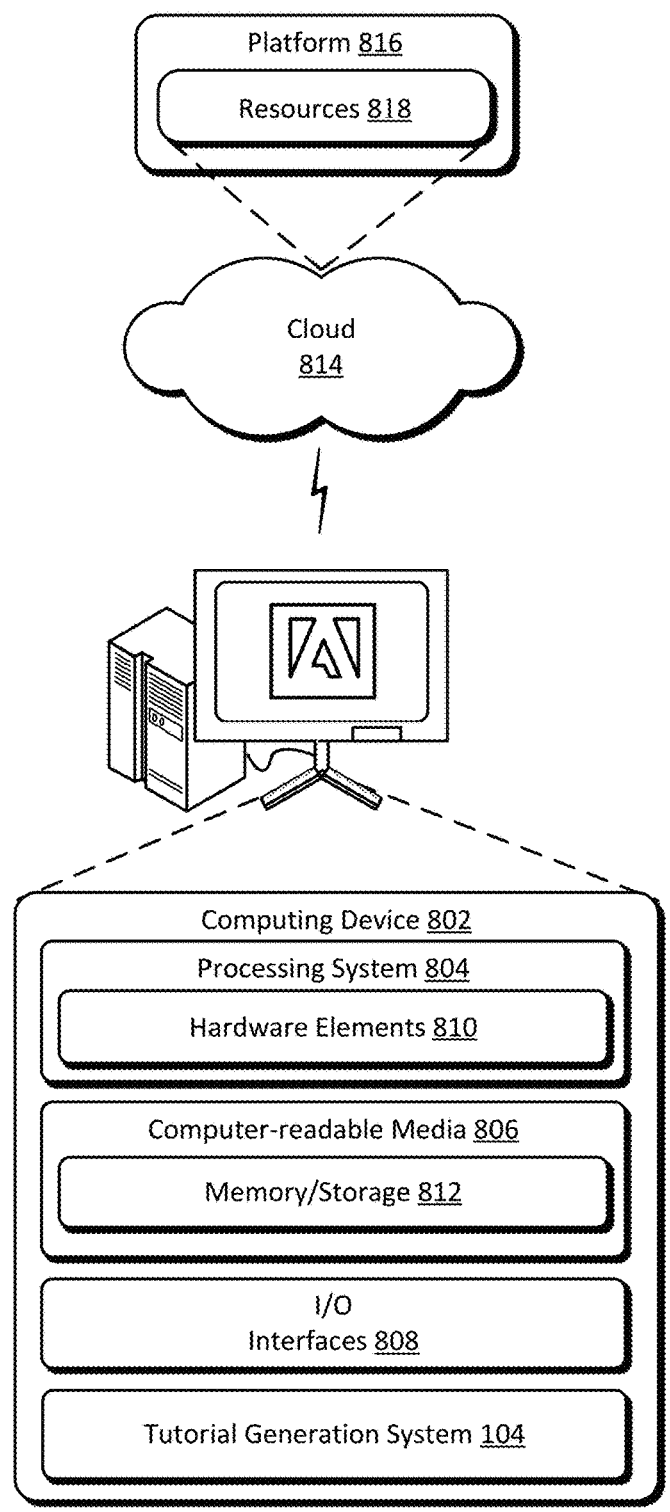
FIG. 8 illustrates an example system including various components of an example device that are implementable as a computing device as described and/or utilized with reference to FIGS. 1-7 to implement the techniques described herein.

FIG. 8 illustrates an example system generally at 800 that includes an example computing device 802 that is representative of one or more computing systems and/or devices that implement the various techniques described herein. This is illustrated through inclusion of the tutorial generation system 104. The computing device 802, for example, is configurable as a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 further includes a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that is configurable as processors, functional blocks, and so forth. This includes implementation in hardware as an application specific integrated circuit or other logic device formed using one or more semiconductors. The hardware elements 810 are not limited by the materials from which they are formed or the processing mechanisms employed therein. For example, processors include semiconductor(s) and/or transistors (e.g., electronic integrated circuits (ICs)). In such a context, processor-executable instructions are electronically-executable instructions.

The computer-readable storage media 806 is illustrated as including memory/storage 812. The memory/storage 812 represents memory/storage capacity associated with one or more computer-readable media. The memory/storage component 812 include volatile media (such as random access memory (RAM)) and/or nonvolatile media (such as read only memory (ROM), Flash memory, optical disks, magnetic disks, and so forth). The memory/storage component 812 include fixed media (e.g., RAM, ROM, a fixed hard drive, and so on) as well as removable media (e.g., Flash memory, a removable hard drive, an optical disc, and so forth). The computer-readable media 806 is configurable in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implemented on a variety of commercial computing platforms having a variety of processors.

An implementation of the described modules and techniques are stored on or transmitted across some form of computer-readable media. The computer-readable media includes a variety of media that are accessed by the computing device 802. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessed by a computer.

"Computer-readable signal media" refers to a signal-bearing medium that is configured to transmit instructions to the hardware of the computing device 802, such as via a network. Signal media typically embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 810. The computing device 802 is configurable to implement particular instructions and/or functions corresponding to the software and/or hardware modules. Accordingly, implementation of a module that is executable by the computing device 802 as software is achieved at least partially in hardware, e.g., through use of computer-readable storage media and/or hardware elements 810 of the processing system 804. The instructions and/or functions are executable/operable by one or more articles of manufacture (for example, one or more computing devices 802 and/or processing systems 804) to implement techniques, modules, and examples described herein.

The techniques described herein are supported by various configurations of the computing device 802 and are not limited to the specific examples of the techniques described herein. This functionality is also implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 include applications and/or data that are utilized while computer processing is executed on servers that are remote from the computing device 802. Resources 818 also include services provided over the Internet and/or through a subscriber network, such as a cellular or Wi-Fi network.

The platform 816 abstracts resources and functions to connect the computing device 802 with other computing devices. The platform 816 also serves to abstract scaling of resources to provide a corresponding level of scale to encountered demand for the resources 818 that are implemented via the platform 816. Accordingly, in an interconnected device embodiment, implementation of functionality described herein is distributable throughout the system 800. For example, the functionality is implemented in part on the computing device 802 as well as via the platform 816 that abstracts the functionality of the cloud 814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium tutorial generation environment, a method implemented by a computing device, the method comprising:
   generating, by a tutorial generation system implemented by the computing device, a digital tutorial automatically and without user intervention, the generating including:
   receiving audio data and history data by an input module, the history data describing a sequence of user inputs involving interaction with a user interface;
   identifying, by a step-identification module, a plurality of tutorial steps based on the sequence of user inputs from the history data;
   generating, by a segmentation module, a plurality of audio segments from the audio data, the plurality of audio segments corresponding to the plurality of tutorial steps, respectively; and
   generating, by a synchronization module, the digital tutorial by synchronizing the plurality of audio segments as part of the plurality of tutorial steps, the synchronizing comprising:
   identifying that one of the plurality of audio segments for one of the plurality of tutorial steps ends during an utterance;
   removing a portion of audio from a subsequent one of the plurality of tutorial steps that includes a remainder of the utterance; and
   adding the removed portion of audio to the one of the plurality of audio steps.

2. The method as recited in claim 1, wherein the digital tutorial is configured to output, for at least one said tutorial step, a visual display of a respective said user input simultaneously with a respective said audio segment.

3. The method as recited in claim 1, wherein the user interface corresponds to an application and the user inputs involve selection of controls displayed in the user interface of the application.

4. The method as recited in claim 1, wherein the plurality of user inputs are generated using a touchscreen or a cursor control device of the computing device and the audio data is generated via a microphone of the computing device.

5. The method as recited in claim 1, wherein the identifying the plurality of tutorial steps includes:
   assigning an activity type to a respective said tutorial step, the activity type defining an action initiated by a respective said user input;
   assigning a start value to the respective said tutorial step, the start value specifying an amount assigned to an attribute prior to performing the action; and
   assigning an end value to the respective said tutorial step, the end value specifying an amount assigned to the attribute after performing the action.

6. The method as recited in claim 1, wherein the identifying the plurality of tutorial steps includes:
   assigning a sequence value to each tutorial step of the plurality of tutorial steps, the sequence value indicating a position of the tutorial step with respect to the plurality of tutorial steps;
   assigning a start timestamp to each tutorial step of the plurality of tutorial steps, the start timestamp designating a beginning time associated with the tutorial step; and
   assigning an end timestamp to each tutorial step of the plurality of tutorial steps, the end timestamp designating an end time associated with the tutorial step.

7. The method as recited in claim 6, wherein the generating the plurality of audio segments is based on the start timestamp and the end timestamp assigned to the plurality of tutorial steps.

8. The method as recited in claim 1, further comprising outputting by the tutorial generation system, a preview of the digital tutorial, the preview including an option to modify a respective said audio segment included as part of a respective said tutorial step.

9. The method as recited in claim 8, further comprising receiving an input via the option to modify the respective said audio segment and modifying the respective said tutorial step by deleting at least a portion of the respective said audio segment from the respective said tutorial step.

10. The method as recited in claim 8, further comprising receiving an input via the option to modify the respective said audio segment and modifying the respective said tutorial step by recording new audio data and adding the new audio data to the respective said tutorial step.

11. The method as recited in claim 10, wherein the adding the new audio data includes replacing at least a portion of the respective said audio segment with the new audio data.

12. The method as recited in claim 1, wherein the digital tutorial is formatted as a portable tutorial format (PTF) document that includes links within the plurality of tutorial steps to the plurality of audio segments, respectively.

13. In a digital medium tutorial generation environment, a system comprising:
   a tutorial generation system implemented at least partially in hardware of a computing device to generate a digital tutorial automatically and without user intervention, the tutorial generation system including:
   an input module to receive audio data and history data, the history data describing a sequence of user inputs involving interaction with a user interface;
   a step-identification module to identify a plurality of tutorial steps based on timestamps assigned to the sequence of user inputs from the history data;
   a segmentation module to generate a plurality of audio segments from the audio data based on the timestamps; and
   a synchronization module to generate the digital tutorial as a digital document by synchronizing the plurality of audio segments as part of the plurality of tutorial steps, the synchronizing comprising:

identifying that one of the plurality of audio segments for one of the plurality of tutorial steps ends during an utterance;

removing a portion of audio from a subsequent one of the plurality of tutorial steps that includes a remainder of the utterance; and adding the removed portion of audio to the one of the plurality of audio steps.

14. The system as recited in claim 13, wherein the digital tutorial is configured during playback to output, for at least one said tutorial step, a visual display of a respective said user input simultaneously with a respective said audio segment.

15. The system as recited in claim 14, wherein the user interface corresponds to an application and the user inputs involve selection of controls displayed in the user interface of the application.

16. The system as recited in claim 14, wherein the plurality of user inputs are generated using a touchscreen or a cursor control device and the audio data is generated via a microphone.

17. The system as recited in claim 14, wherein the step-identification module is configured to identify the plurality of tutorial steps by:

assigning an activity type to a respective said tutorial step, the activity type defining an action initiated by a respective said user input;

assigning a start value to the respective said tutorial step, the start value specifying an amount assigned to an attribute prior to performing the action; and assigning an end value to the respective said tutorial step, the end value specifying an amount assigned to the attribute after performing the action.

18. The system as recited in claim 14, wherein the step-identification module is configured to identify the plurality of tutorial steps by:

assigning a sequence value to each tutorial step of the plurality of tutorial steps, the sequence value indicating a position of the tutorial step with respect to the plurality of tutorial steps;

assigning a start timestamp to each tutorial step of the plurality of tutorial steps, the start timestamp designating a beginning time associated with the tutorial step; and assigning an end timestamp to each tutorial step of the plurality of tutorial steps, the end timestamp designating an end time associated with the tutorial step.

19. In a digital medium tutorial generation environment, a system comprising:

means for receiving audio data and history data, the history data describing a sequence of user inputs involving interaction with a user interface;

means for identifying a plurality of tutorial steps based on the sequence of user inputs from the history data;

means for generating a plurality of audio segments from the audio data, the plurality of audio segments corresponding to the plurality of tutorial steps, respectively; and means for generating a digital tutorial by synchronizing the plurality of audio segments as part of the plurality of tutorial steps, the synchronizing performed automatically and without user intervention by:

identifying that one of the plurality of audio segments for one of the plurality of tutorial steps ends during an utterance;

removing a portion of audio from a subsequent one of the plurality of tutorial steps that includes a remainder of the utterance; and adding the removed portion of audio to the one of the plurality of audio steps.

20. The system as recited in claim 19, wherein the identifying means includes means for identifying the plurality of tutorial steps based on timestamps included in the history data describing the sequence of user inputs.

* * * * *